United States Patent [19]

Valentine

[11] 4,438,959

[45] Mar. 27, 1984

[54] TORSIONALLY DEFLECTABLE SEAL RING ASSEMBLY FOR FLUID-RECEIVING SYSTEMS

[75] Inventor: Gordon A. Valentine, Denver, Colo.

[73] Assignee: Stanley Aviation Corporation, Denver, Colo.

[21] Appl. No.: 326,521

[22] Filed: Dec. 2, 1981

[51] Int. Cl.³ .................... F16L 19/08; F16L 25/00; F16L 35/00
[52] U.S. Cl. .................................. 285/340; 285/12; 285/18; 285/354
[58] Field of Search ................... 285/340, 18, 12, 354

[56] References Cited

U.S. PATENT DOCUMENTS

| | | | |
|---|---|---|---|
| 2,632,431 | 3/1953 | Suter | 285/340 X |
| 3,625,552 | 12/1971 | Mahoff | 285/340 X |
| 4,109,942 | 8/1978 | Morrill | 285/340 X |
| 4,235,461 | 11/1980 | Normark | 285/340 |

*Primary Examiner*—Richard J. Scanlan, Jr.
*Attorney, Agent, or Firm*—LeBlanc, Nolan, Shur & Nies

[57] ABSTRACT

A fluid-receiving assembly having a pair of relatively axially displaceable structures, a torsionally deflectable seal ring for establishing a seal between the structures, and a pair of formations engaging diagonally opposite corner edges of the seal ring to torsionally deflect it to its seal establishing condition, one of the formations being formed on one of the structures and the other of the formations being formed in part by the other structure and in part by an adapter ring.

14 Claims, 7 Drawing Figures

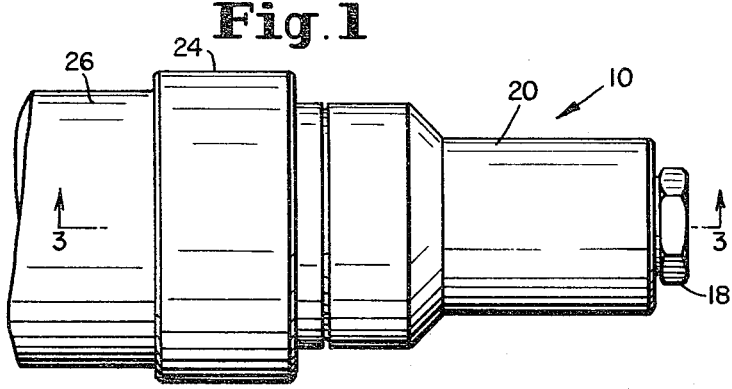
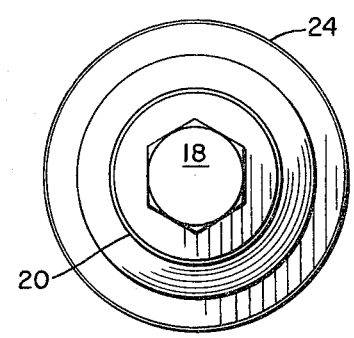
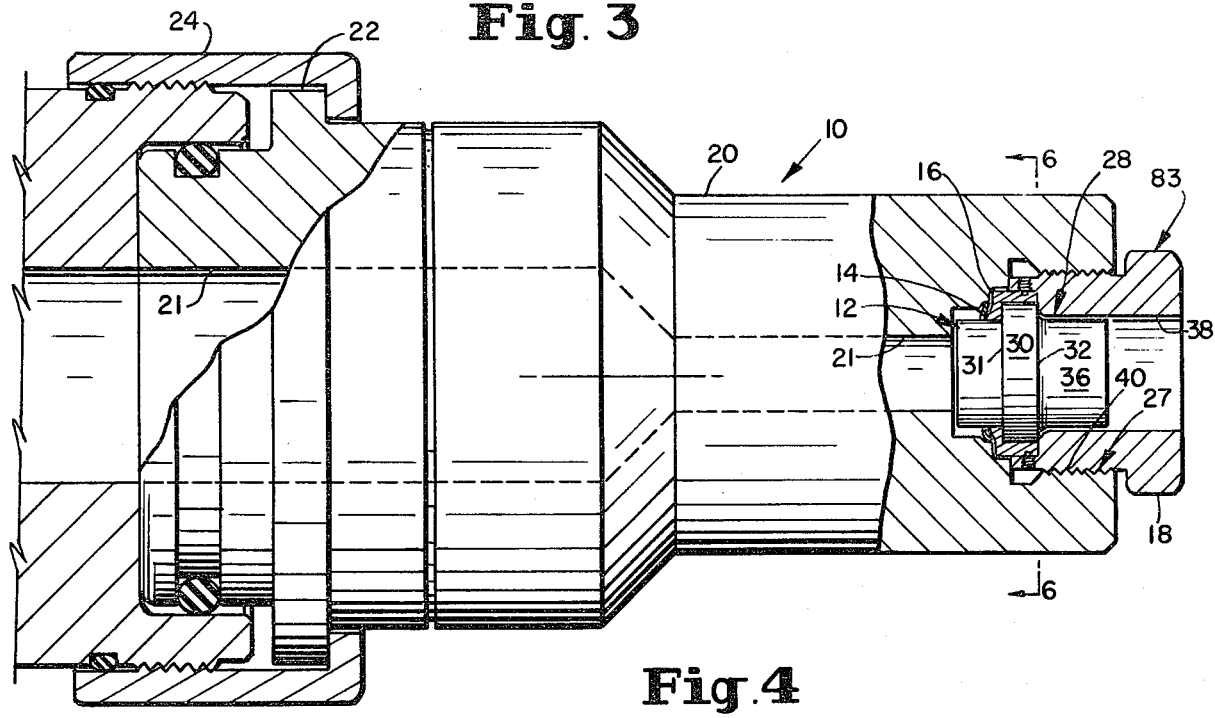
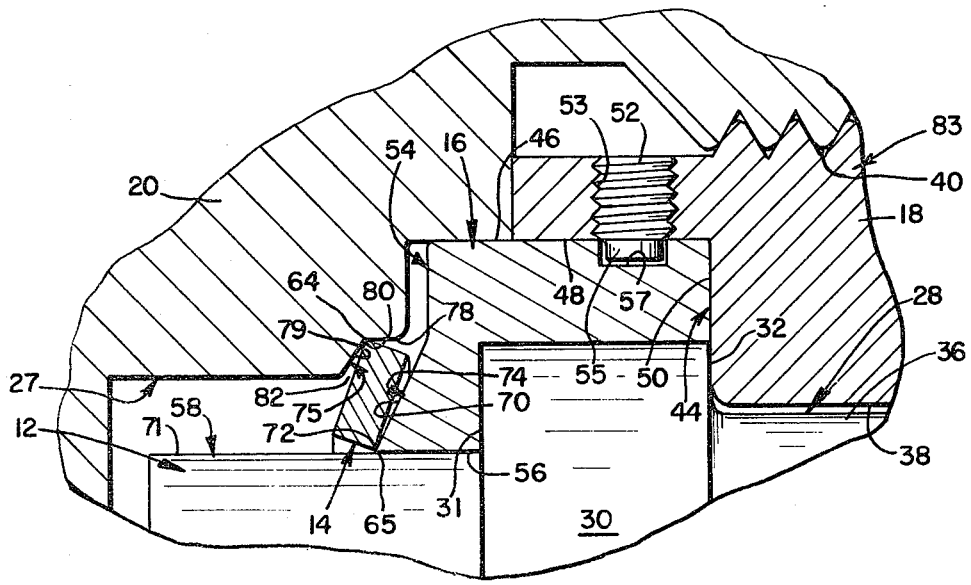

TORSIONALLY DEFLECTABLE SEAL RING ASSEMBLY FOR FLUID-RECEIVING SYSTEMS

FIELD OF INVENTION

This invention relates to couplings and other assemblies wherein a seal member is used to establish a fluid-tight seal between male and female parts in a fluid-receiving system.

BACKGROUND

Prior to this invention various seal ring constructions have been used to prevent leakage of fluid between parts of a pipeline or other fluid-receiving system. For example, a particularly effective seal ring construction is disclosed in U.S. Pat. No. 3,625,552 which issued to George A. Mahoff on Dec. 7, 1971.

In order to establish a seal between male and female coupling parts with the Mahoff seal ring, special male and female or inner and outer formations are required for torsionally deflecting the seal ring. In the Mahoff patent, these formations are formed on the coupling parts and define a cavity for receiving the seal ring.

Each of the special, cavity-defining formations in the Mahoff assembly is defined by a cylindrical surface and by a conical surface which intersects the cylindrical surface to form a circumferentially extending corner. The cylindrical surfaces of the cavity-defining formations are overlapping, while the conical surfaces of the formations confront each other so that as the coupling parts are drawn axially together, the diagonally opposite corner edges of the seal ring slide along the formations to seat in the formations' corners. Further relative axial movement of the coupling parts toward each other then deforms the seal ring into a cone-shaped configuration in which the radial dimension of the seal ring is increased to cause the interference that produces the fluid tight seal.

Various parts requiring a seal, however, are not manufactured with the special cavity-defining formation which is needed for torsionally deflecting the Mahoff seal ring. Furthermore, it is not feasible or practical in some cases to machine or otherwise modify the part to form the required formation for engaging the seal ring. One solution to this problem is to custom build the part. But such a solution has the drawback of substantially increasing the cost of the assembly.

SUMMARY AND OBJECTS OF INVENTION

In solving the foregoing problem, the present invention contemplates a novel adapter for inexpensively adapting various parts for use with the Mahoff seal ring where the parts are not originally manufactured with the required cavity-defining formation. In one form, the adapter of this invention is used to provide the inner cavity-defining formation. In a modified form it is used to provide the outer cavity-defining formation. Both forms of the adapter may be used in the same assembly where neither of the male and female parts is formed with the required formation for deflecting the Mahoff seal ring.

In one of the illustrated embodiments, the adapter of this invention has a conical end face which coacts with an exterior cylindrical surface on the male part to define the required formation for engaging the inner corner edge of the seal ring. The assembly's female part receives the subassembly of the adapter and male part and is formed with the outer cavity-defining formation for engaging the outer corner edge of the seal ring. The adapter is selectively displaceable relative to the female part for torsionally deflecting the seal ring to establish the fluid tight seal between the male and female parts.

With the foregoing in mind, the general aim and purpose of this invention is to provide a novel adapter for adapting a part for use with a torsionally deflectable seal ring where the part is not originally manufactured with the required formation for deflecting the seal ring.

A more specific object of this invention is to provide a novel assembly wherein an adapter cooperates with one of the male and female members to define one of the two formations which are required for torsionally deflecting the seal ring.

Further objects of this invention will appear as the description proceeds in connection with the below-described drawings and the appended claims.

DESCRIPTION OF DRAWINGS

FIG. 1 is a plan view of a fluid-pressure transducer assembly incorporating the principles of this invention;

FIG. 2 is a right-hand end view of the assembly shown in FIG. 1;

FIG. 3 is a longitudinal section taken substantially along lines 3—3 of FIG. 1;

FIG. 4 is an enlarged fragmentary view of FIG. 3;

DETAILED DESCRIPTION

Figure 5:
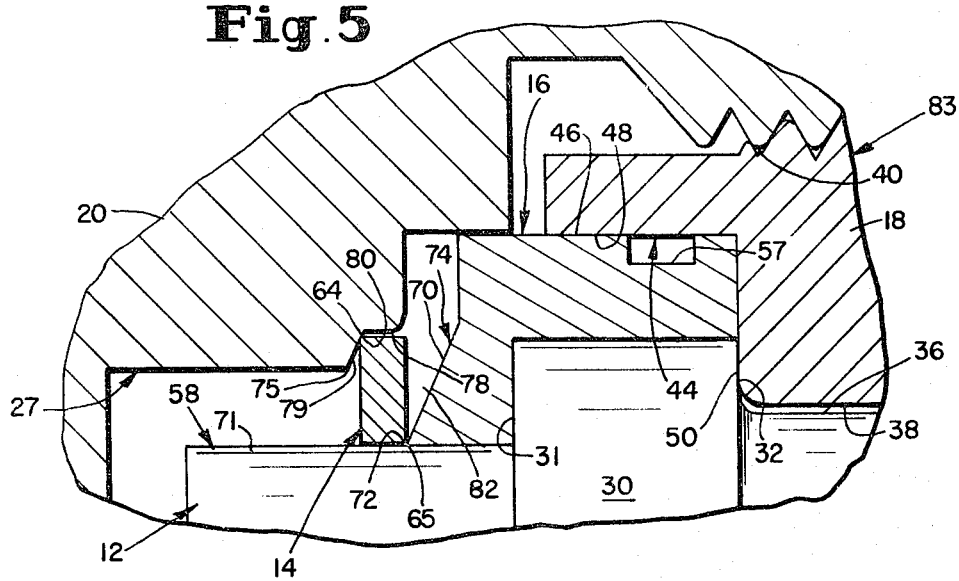
FIG. 5 is a sectioned view similar to FIG. 4 but showing the parts at an intermediate stage of assembly before the seal ring is torsionally deflected to establish a seal.
Figure 6:
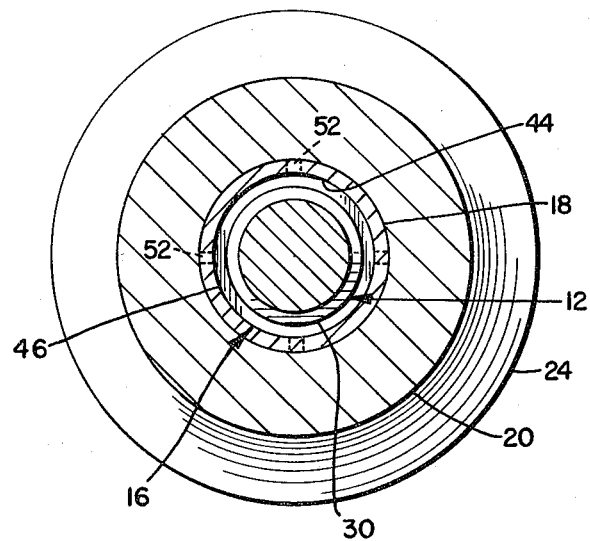
FIG. 6 is a transverse section taken substantially along lines 6—6 of FIG. 3.

Referring to FIGS. 1-6, the fluid-pressure transducer assembly incorporating the principles of this invention is generally indicated at 10 and mainly comprises a fluid pressure transducer 12, a torsionally deflectable seal ring 14, a tubular adapter 16, a transducer retaining nut 18 and a female housing 20. In this embodiment, transducer 12 constitutes the male member and is manufactured without the formation which is required for torsionally deflecting seal ring 14.

Female housing 20 is formed with a through passage 21 and terminates at one end in a coupler flange 22 by which it may be coupled by a suitable coupler 24 to a fitting 26 in a fluid-conveying pipeline or other fluid-receiving system to establish fluid communication between passage 21 and the pipeline or other fluid-receiving system. Coupler 24 may be of any suitable, conventional construction.

At its end remote from coupler flange 22, passage 21 is formed with a diametrically stepped bore section 27 which receives transducer 12, seal ring 14, adapter 16 and nut 18. Transducer 12 may be of any suitable, conventional construction and is shown in FIG. 3 to have a cylindrical housing 28 which is stepped to define a diametrically enlarged intermediate section 30. Intermediate section 30 defines a pair of radially extending, annular shoulders 31 and 32 which face in axially opposite directions.

Transducer 12 is coaxially received in the stepped bore section 27 and extends coaxially through adapter 16 and seal ring 14. The outer, reduced diametered end section 36 of transducer housing 28 is coaxially received in a uniformly diametered bore 38 which is formed through retaining nut 18. Nut 18 is coaxially threaded into an outer internally threaded portion 40 of bore 27.

The inner end of transducer 12 is provided with a pressure sensitive element (such as a diaphragm) for sensing the pressure of a pressurized fluid in passage 21. Transducer 12 converts the sensed pressure into a suitable signal, such as an electrical signal.

At its inner end, retaining nut 18 is formed with an annular recess 44 for receiving the enlarged intermediate section 30 of transducer housing 28 and an annular portion 46 of adapter 16. Recess 44 is formed by a cylindrical side wall 48 and a flat, radially extending bottom wall or shoulder 50. The adapter's annular portion 46 is interfittingly and rotatably seated in recess 44.

Seating engagement of annular portion 46 with the nut's cylindrical wall 48 confines adapter 16 against radial displacement relative to nut 18. Adapter 16 is confined against axial displacement relative to nut 16 by engagement with shoulder 50 and by a set of four screws 52. Screws 52 are threaded into equiangularly spaced apart, radially extending tapped bores 53 (one shown in FIG. 4) in nut 18. Screws 52 terminate in cylindrically smooth ends 55 which slidably protrude into a radially outwardly extending annular groove 57 on adapter 16. Abutment of the screws' cylindrical ends 55 with the side walls of the adapter's groove 57 limit axial displacement of adapter 16 relative to nut 18 and axially locates adapter 16 relative to nut 18, but allows nut 18 to rotate relative to adapter 16. The purpose of this construction allows nut 18 to be threaded into and out of female housing 20 without rotating adapter 16 and hence without requiring nut 18 to be rotated against seal ring 14 during assembly and disassembly of the component parts.

Because adapter 16 is mounted for axial displacement with nut 18, adapter 16 and nut 18 are insertable as a unit into housing 20 and also removable as a unit from housing 20. Adapter 16 is detachable from nut 18 by removing screws 52.

As best shown in FIG. 4, the end of adapter 16 lying axially beyond retaining nut 18 is formed within a circumferentially extending lip or flange 54. Flange 54 extends radially inwardly and terminates in a cylindrical surface 56 which coaxially and circumferentially surrounds the inner reduced diametered end portion 58 of transducer housing 28.

The enlarged section 30 of housing 28 is coaxially received in the adapter's annular portion 46 and lies axially between the adapter's radially inwardly extending flange portion 54 and the retaining nut's shoulder 50.

Transducer 12 is confined against axial movement relative to the subassembly of adapter 16 and retaining nut 18 by seating engagement of the transducer housing's intermediate section 30 with shoulder 50 and flange portion 54. Radial displacement of transducer 12 relative to the subassembly of adapter 16 and retaining nut 18 is limited by seating engagement of the outer cylindrical periphery of enlarged portion 30 with the inner cylindrical periphery of the adapter's annular portion 46.

As best shown in FIG. 4, seal ring 14 is of the same construction as that disclosed in the previously identified Mahoff U.S. Pat. No. 3,625,552 and is formed with a rectangular cross section to define a pair of circumferentially extending diagonally opposite corner edges 64 and 65. The disclosure of the Mahoff U.S. Pat. No. 3,625,552 is hereby incorporated into this specification by reference. As disclosed in the Mahoff patent, seal ring 14 is formed from a suitable metal which is resilient and preferably somewhat ductile.

As best shown in FIG. 4, the adapter's flange 54 is formed with an outer conical surface 70 (i.e., a circumferential surface lying in a conical envelope). Surface 70 extends to the inner circumferentially extending corner edge of flange 54 which is closely adjacent to the cylindrical peripheral surface 71 of the transducer housing's end portion 58. By this construction, conical surface 70 cooperates with cylindrical surface 71 to define a circumferentially extending corner 72 for receiving the inner corner edge 65. The flange portion 54 of adapter 16 and the cylindrical end portion 58 of transducer housing 28 thus cooperates to define the inner formation (indicated at 74 in FIG. 4) for engaging and torsionally deflecting seal ring 14. The conical envelope containing surface 70 intersects surface 71 at an obtuse angle.

In the embodiment shown in FIG. 4, the outer seal ring-engaging formation (indicated at 75) is integral with female housing 20 and is formed by two contiguous, peripherally extending surfaces 78 and 79 in the stepped bore section 27. Surface 78 is cylindrical. Surface 79 is conically contoured and therefore lies in a conical envelope. Surfaces 78, 79 intersect each other at an obtuse angle to define an outer peripherally extending corner 80 for receiving the seal ring's outer corner edge 64. Corner 80 opens in the direction of corner 72.

Surfaces 70, 71, 78 and 79 define a circumferentially extending cavity 82 which receives seal ring 14 and which coaxially and peripherally surrounds the inner end portion 58 of transducer housing 28. Cylindrical surfaces 71 and 78 are overlapping and radially spaced apart, and conical surfaces 70 and 79 confront each other. Surfaces 70 and 79 have equal slopes and are parallel.

In the final assembly, the seal ring's diagonally opposite corner edges 64 and 65 are seated in corners 72 and 80, respectively, to torsionally deflect the seal ring to its seal-establishing condition where a first fluid tight sealing interface is established at the line of contact between cylindrical surface 71 and seal corner 72 and a second fluid tight sealing interface is established at the line of contact between cylindrical surface 78 and seal corner 80.

For assembling the parts of assembly 10 and establishing a fluid tight seal with seal ring 14, transducer 12, seal ring 14, adapter 16 and retaining nut 18 are pre-assembled outside of housing 20. The subassembly of these parts is indicated at 83 and is inserted as a unit into the female housing's stepped bore section 27 by threading nut 18 into the threaded end portion 40 of the stepped bore. Alternatively, seal ring 14 may first be positioned in stepped bore section 27 and the preassembled subassembly of transducer 12, adapter 16 and nut 18 may thereafter be installed in housing 20 by threading nut 18 into bore portion 40.

In its relaxed, undeflected condition, seal ring 14 is positioned on the inner end portion 58 of transducer housing 28 with a somewhat loose fit and lies forwardly of the adapter's flange portion 54. Sufficient radial clearance is initially provided between seal ring 14 and the reduced diametered end portion 58 of the transducer housing 28 and also between seal ring 14 and the female housing's cylindrical surface 78 to enable seal ring 14 to be torsionally deflected to its seal-establishing condition.

As retaining nut 18 is threaded into the stepped bore portion 40, subassembly 83 will be displaced axially inwardly, with adapter 16 pushing seal ring 14 ahead of it to the positions of parts shown in FIG. 5 of the drawings. Upon further inward axial displacement of subassembly 83, corners 80 and 72 will engage the seal ring's corner edges 64 and 65 to apply a force couple to seal ring 14. The force couple torsionally deflects the seal ring about its cross section to its seal-establishing condition shown in FIG. 4.

In FIG. 4 it will be observed that the seal will be established where only the diagonally opposite corner edges 64, 65 engage cylindrical surfaces 71 & 78 at corners 72 and 80. In this position, the annular end faces of seal ring 14 will likewise be spaced from the opposing conical surfaces 70 and 79, and the inner and outer peripheral surfaces of seal ring 14 will likewise be spaced from the cylindrical surfaces 71 and 78. Seal ring 14 may be torsionally deflected to a further extent where its oppositely directed end faces seat against conical surfaces 70, 79 as shown, for example, in FIG. 3 of the Mahoff patent, but such additional torsional deflection of the seal ring is unnecessary for establishing the fluid tight seal between female housing 20 and the transducer housing 28.

Upon being torsionally deflected, seal ring 14 will be deformed to a cone-shaped configuration in which the radial dimension of the seal ring is increased to cause the interference that produces the fluid tight seal. It will be appreciated that the torsional deflection of seal ring 14 is brought about by the force couple mentioned above which effectively pivots or rotates the seal ring's cross section about one of its diagonally opposite corner edges 64, 65. Seal ring 14 will therefore be radially, compressively loaded at corner edges 64, 65.

From the foregoing description, it will be appreciated that adapter 16 performs two additional functions. First, it operates as a spacer ring between seal ring 14 and retaining nut 18. Second, it cooperates with nut 18 to confine transducer 12 against movement relative to the subassembly of adapter 16 and nut 18 such that the entire subassembly of transducer 12, adapter 16 and nut 18 can be installed as a unit in housing 20 and also removed as a unit from housing 20.

It also will be appreciated that adapter 16 is inexpensive to manufacture and provides an inexpensive expedient for adapting transducer 12 for use with a torsionally deflectable seal ring of the type described above. As a result, the transducer's housing does not have to be customized or modified to provide the inner conical surface which is required along with the other surfaces for torsionally deflecting seal ring 14.

Figure 7:
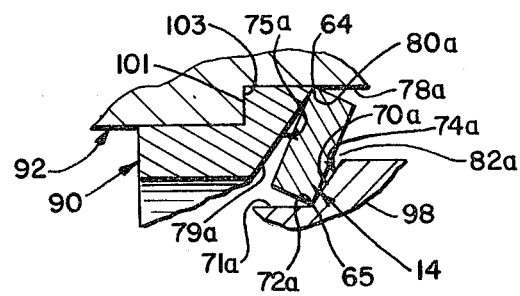
FIG. 7 is a sectioned view similar to FIG. 4 but showing an alternate embodiment in which the adapter of this invention forms the outer cavity-defining formation.

In the embodiment shown in FIGS. 1-6, adapter 16 is used to adapt the male member of a male/female assembly for use with seal ring 14. In FIG. 7, a slightly modified tubular adapter 90 is used to adapt a tubular female member 92 for use with seal ring 14.

Referring to FIG. 7, female member 92 is formed with the required cylindrical surface 78a, but does not have the additional conical surface for defining the outer seal ring-engaging formation.

Adapter 90 is coaxially received in female member 92. The end face of adapter 90 facing seal ring 14 is formed with the required conical surface 79a which extends to the adapter's outer circumferentially extending corner edge adjoining surface 78a for defining the circumferentially extending seal corner 80a of the outer seal-ring engaging formation 75a. Seal corner 80a receives the seal ring's outer corner edge 64. In the embodiment of FIG. 7, the inner seal ring-engaging formation 74a is integral with the assembly's male member 98 and is formed with the cylindrical surface 71a and conical surface 70a. Surfaces 70a and 71a intersect to define the inner formation's circumferentially extending corner 72a for receiving the inner one of the seal ring's inner corner edge 65.

In the embodiment of FIG. 7, seal ring 14 circumferentially surrounds male member 98 and is received in the circumferentially extending cavity 82a which is defined by surfaces 70a, 71a, 78a and 79a. The cylindrical surfaces 71a and 78a are overlapping, and the conical surfaces 70a and 79a confront each other as shown. The assembly of the embodiment shown in FIG. 7 may include any suitable means (not shown) for axially displacing the female and male members 92, 98 relative to each other to seat the diagonally opposite corner edges of seal ring 14 in corners 72a and 80a and to thereby torsionally deflect the seal ring to the seal-establishing condition shown in FIG. 7 where it establishes a seal between the female and male members.

In the embodiment of FIG. 7, adapter 90 may be formed with an annular, radially extending shoulder 101 which faces axially away from seal ring 14. Shoulder 101 seats against a mating annular shoulder 103 which is formed on the interior side of female member 92 to limit axial movement of the adapter away from seal ring 14. Adapter 90 is therefore confined against axial movement relative to female member 92 between shoulder 103 and seal ring 14. Adapter 90 is confined against radial displacement by engagement with the female member's internal cylindrical surface 78a.

Adapter 90 is advantageously rotatably received in female member 92 to allow female member 92 to be rotated relative to adapter 90 so that it will not be rotated against seal ring 14 during assembly and disassembly of parts. The male and female members 98 and 92 may constitute the male and female parts of a coupling and may be axially drawn together and coupled together by any suitable means such as that shown in the Mahoff patent.

Where neither the female member nor the male member of the assembly is provided with the conical surfaces for torsionally deflecting the seal ring, it will be appreciated that the adapters 16 and 90 may be used together to provide the formations for torsionally deflecting the seal ring.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid-receiving assembly first and second relatively axially displaceable structures, said first structure having a tubular configuration for receiving fluid under pressure, said second structure having at least a portion received in said first structure, a torsionally deflectable seal ring received in said first structure and circumferentially surrounding said portion of said second structure, said seal ring being formed with at least a pair of diagonally opposite inner and outer corner edges and being torsionally deflectable to establish a seal between said first and second structures, an adapter formed separately of said first and second structures and having a tubular cross section, said adaptor being received in said first structure for axial displacement with one of said structures relative to the other of said structures, and first and second formations delimiting a cavity receiving said seal ring and positioned to engage said inner and outer corner edges, respectively, upon relative axial displacement of said structures for torsionally deflecting said seal ring to its seal-establishing condition, one of said formations being formed in part by said adapter and in part by a preselected one of said structures, and the other of said formations being formed on the other of said structures, said one of said formations being defined by a peripherally extending surface and by a further surface adjoining said peripherally extending surface, said peripherally extending surface being formed on said preselected one of said structures, and said further surface being formed on an end of said adapter and being contained in a conical envelope intersecting said peripherally extending surface at an obtuse angle such that said peripherally extending surface and said further surface cooperate to define a peripherally extending corner which receives one of said diagonally opposite corner edges of said seal ring.

2. The fluid-receiving assembly defined in claim 1 wherein said other of said formations is formed on said first structure, wherein said peripherally extending surface is formed on said portion of said second structure, and wherein said adapter circumferentially surrounds said second structure.

3. The fluid-receiving assembly defined in claim 2 including a further part extending into said first structure and mounted on said first structure for selective axial displacement relative to said first structure, said adapter being mounted for axial displacement with said further part.

4. The fluid-receiving assembly defined in claim 3 wherein said first structure is formed with a fluid-receiving passage which terminates at one end in an internally threaded bore portion, and wherein said further part is threaded with said bore portion.

5. The fluid-receiving assembly defined in claim 4 wherein adapter and said further part engage said second structure to confine said second structure against axial movement relative to the subassembly of said adapter and said further part.

6. The fluid-receiving assembly defined in claim 1 wherein said other of said formations is formed on said second structure, and wherein said peripherally extending surface is formed on said first structure.

7. The fluid-receiving assembly defined in any one of the preceding claims 1–5 wherein said second structure is a fluid pressure transducer, and wherein said peripherally extending surface is a cylindrical surface.

8. The fluid-receiving structure defined in any one of the preceding claims 1–6 wherein said peripherally extending surface is a cylindrical surface.

9. The fluid-receiving assembly defined in any one of the preceding claims 1–6 wherein said other of said formations is defined by first and second peripherally extending surfaces, said first surface being a cylindrical surface, and said second surface being contained in a conical envelope and intersecting said first surface at an obtuse angle to define a further peripherally extending corner which is positioned to receive and engage the other of said diagonally opposite corner edges of said seal ring.

10. In a fluid-receiving assembly, a fluid-receiving structure for receiving fluid under pressure, further structure having at least a porrion received in said fluid-receiving structure, at least one of said structures being mounted for axial displacement relative to the other of said structures, a seal ring circumferentially surrounding said portion of said further structure and having at least a pair of diagonally opposite corner edges, said corner edges being respectively disposed at the inner and outer peripheries of said ring, and said seal ring being torsionally deflectable to establish a seal between said structures at regions lying along said corner edges, said fluid-receiving structure being interiorly provided with a formation for engaging one of said corner edges, and an adapter formed separately of said structures and having a tubular cross section, said adapter circumferentially surrounding said portion of said further structure and coacting with said portion to define a circumferentially extending corner for engaging the other of said corner edges, said formation coacting with said circumferentially extending corner to torsionally deflect said seal ring as one of said structures is axially displaced relative to the other of said structures for establishing said seal.

11. The fluid-receiving assembly defined in claim 10 wherein said circumferentially extending corner is defined by first and second surfaces, said first surface being cylindrical and formed on said portion of said further structure, and said second surface being formed on said adapter and contained in a conical envelope which intersects said first surface.

12. In a fluid-receiving assembly, a tubular fluid-receiving structure for receiving fluid under pressure, a further structure having at least a portion received in said fluid-receiving structure, at least one of said structures being mounted for axial displacement relative to the other of said structures, a seal ring circumferentially surrounding said portion of said further structure and having at least a pair of diagonally opposite corner edges, said corner edges being respectively disposed at the inner and outer peripheries of said ring, and said seal ring being received in said fluid-receiving structure and being torsionally deflectable to establish a seal between said structures at regions lying along said corner edges, said further structure being provided with a formation for engaging one of said corner edges, and an adaptor formed separately of said structures and having a tubular cross section, said adapter being received in and coacting with said fluid-receiving structure to define a peripherally extending corner for engaging the other of said corner edges, said formation coacting with said peripherally extending corner to torsionally deflect said seal ring as one of said structures is axially displaced relative to the other of said structures in such a manner to compressively radially load said seal ring at said corner edges for establishing said seal.

13. The fluid-receiving assembly defined in claim 12 wherein said peripherally extending corner is defined by first and second surfaces, said first surface being cylindrical and formed on said tubular structure, and said second surface being formed on said adapter and contained in a conical envelope which intersects said first surface at an obtuse angle.

14. In a fluid-receiving assembly, first and second relatively axially displaceable structures, said first structure having a tubular configuration for receiving fluid under pressure, said second structure having at least a portion received in said first structure, a torsionally deflectable seal ring received in said first structure and circumferentially surrounding said portion of said second structure, said seal ring being formed with at least a pair of diagonally opposite inner and outer corner edges, said seal ring having a flattened, relaxed condition and being torsionally deflectable from said relaxed condition to establish a seal between said first and second structures, an adapter formed separately of said first and second structures and having a tubular cross section, said adapter being slidably received in said first structure for axial displacement with one of said structures relative to the other of said structures, and first and second formations delimiting a cavity receiving said seal ring and defining circumferentially extending corners, said corners engaging said inner and outer corner edges upon relative axial displacement of said structures for torsionally deflecting said seal ring to compressively radially load said seal ring at said corner edges and to thereby establish the seal between said structures, one of said formations being formed in part by said adapter and in part by a preselected one of said structures, and the other of said formations being formed on the other of said structures.

* * * * *

UNITED STATES PATENT AND TRADEMARK OFFICE
CERTIFICATE OF CORRECTION

PATENT NO. : 4,438,959

DATED : March 27, 1984

INVENTOR(S) : Gordon A. Valentine

It is certified that error appears in the above—identified patent and that said Letters Patent is hereby corrected as shown below:

Claim 7, line 2, change "1-5" to --1 and 2-5--.

Claim 8, line 2, change "1-6" to --1 and 2-6--.

Claim 9, line 2, change "1-6" to --1 and 2-6--.

Signed and Sealed this

Twentieth Day of November 1984

[SEAL]

Attest:

GERALD J. MOSSINGHOFF

Attesting Officer

Commissioner of Patents and Trademarks